May 20, 1969  J. R. HARNISH  3,444,699
REFRIGERATION SYSTEM WITH ACCUMULATOR MEANS
Filed July 24, 1967
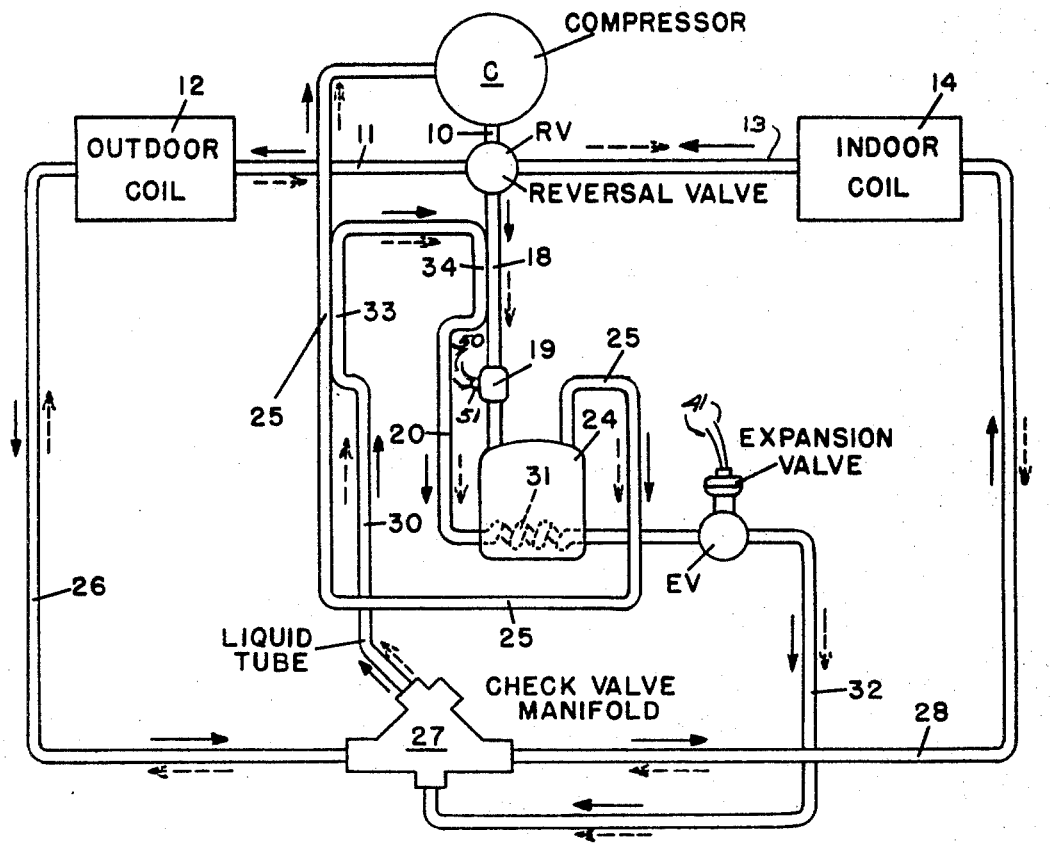
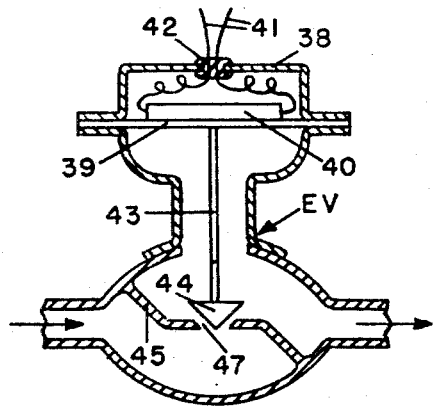
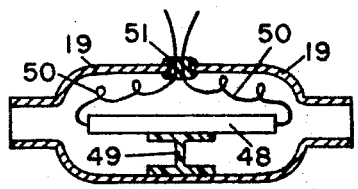
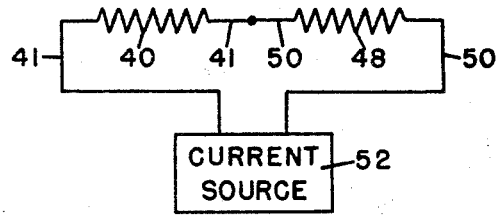
INVENTOR:
JAMES R. HARNISH,
BY Robert J. Palmer   ATTORNEY United States Patent Office 3,444,699
Patented May 20, 1969

3,444,699
REFRIGERATION SYSTEM WITH
ACCUMULATOR MEANS
James R. Harnish, Staunton, Va., assignor to Westinghouse Electric Corporation, Pittsburgh, Pa., a corporation of Pennsylvania
Filed July 24, 1967, Ser. No. 655,417
Int. Cl. F25b 13/00, 41/04
U.S. Cl. 62—225    16 Claims

ABSTRACT OF THE DISCLOSURE

An expansion valve of a refrigeration system responds to the flow of refrigerant liquid from an evaporator towards an accumulator; opens wider on a decrease in the flow of refrigerant liquid, and closes further on an increase in the flow of refrigerant liquid. Heat exchange is provided between the high pressure liquid flowing to the expansion valve and the refrigerant flowing from the evaporator; between liquid within the accumulator and the high pressure liquid, and between the suction gas flowing from the accumlator to the compressor of the system, and the high pressure liquid.

Field of the invention

The field of the invention is refrigeration systems in which evaporators are fed by modulating expansion valves. Thermostatic expansion valves are the most widely used modulating expansion valves. They respond to superheat in suction gas, and operate to prevent refrigerant liquid from flowing from evaporators, some of the evaporator surface being used to superheat the gas leaving an evaporator. In multizone direct expansion, air cooling systems, as well as in other systems having varying air flow over evaporator coils, at reduced air flow, refrigerant distribution through the evaporators becomes poor so that a thermostatic expansion valve cannot operate properly. Another disadvantage of a thermostatic expansion valve is that when used with a condenser coil cooled by outdoor air, at low outdoor temperatures, the condensing pressure is insufficient to operate the expansion valve properly.

My U.S. Patent No. 3,264,837 discloses a system which uses a subcooling control valve as an expansion valve, and which has none of the faults of a system using a thermostatic expansion valve. There is a large amount of subcooling of the refrigerant liquid so that the evaporator is overfed so that all of its internal surface is thoroughly wetted with increased heat transfer and efficiency. This is accomplished with the system of the present invention. Another feature of the system of the present invention is that some of the subcooling is accomplished by heat exchange contact between a portion of the high pressure liquid line and the line connecting an evaporator to an accumulator, some of the liquid flowing from the evaporator being evaporated by this heat exchange.

Summary of the invention

In a refrigeration system consisting of a compressor, a condenser, a liquid line, a heat exchange coil within an accumlator, an expansion valve, an evaporator, and a suction gas line connected in series in the order named, the expansion valve has a bimetallic diaphragm with a heater resistor in heat exchange contact therewith. The liquid line has a portion in heat exchange contact with the suction gas line, has another portion in heat exchange contact with the line connecting the accumulator to the evaporator, and is connected through the heat exchange coil within the accumulator to the expansion valve. The line connecting the accumulator to the evaporator contains downstream of the contact of that line with the liquid line, a NTC (negative temperature coefficient of resistance) thermistor connected electrically in series with the heater resistor to an electric current source. The evaporator is overfed so that, for example, 8% refrigerant liquid and 92% gas flow from the evaporator into the line containing the thermistor. The portion of that line upstream of the thermistor in contact with the liquid line provides heat exchange between the high pressure liquid and the 8% liquid resulting in most of the 8% liquid being evaporated by heat from the high pressure liquid, so that, for example, 1% liquid and 99% gas flow in contact with the thermistor, the high pressure liquid being subcooled by this heat exchange. When more than 1% liquid flows in contact with the thermistor, the latter is so cooled, and its resistance so increased that the current flowing through the heater resistor is so reduced, that the bimetallic diaphragm which is connected to the valve piston of the expansion valve, warps in a direction to move the valve piston towards closed position to decrease the amount of refrigerant supplied to the evaporator. When less than 1% liquid flows in contact with the thermistor, the temperature of the latter increases, and its resistance decreases so that more current flows through the heater resistor, causing the bimetallic diaphragm to warp in the opposite direction to adjust the valve piston of the expansion valve towards open position to increase the amount of refrigerant supplied to the evaporator.

Heat from the high pressure liquid flowing through the coil within the accumulator, evaporates refrigerant liquid that has flowed into the accumulator, the high pressure liquid being further subcooled by this heat exchange. Heat from the high pressure liquid flowing through that portion of the liquid line that is in contact with the suction gas line, evaporates any refrigerant liquid which may have entered the suction gas line, the high pressure liquid being further subcooled by this heat exchange.

The large amount of subcooling greatly increases the refrigerating effect. The overfeeding of the evaporator results in all of its internal surface being thoroughly wetted with increased heat transfer and efficiency. The subcooling prevents the evaporator from being starved at low outdoor temperatures. When the system is a heat pump, the surge that results when the flow of refrigerant is reversed, is absorbed within the accumulator. At no time does any refrigerant liquid enter the compressor.

Brief description of the drawings

FIG. 1 is a diagrammatic view of a heat pump embodying this invention;

FIG. 2 is an enlarged view, in section of the expansion valve of FIG. 1;

FIG. 3 is an enlarged view, in section, of the coupling of FIG. 1, containing a thermistor, and FIG. 4 is a circuit schematic showing the heater resistor of FIG. 2, and the thermistor of FIG. 3, connected to an electric current source.

Description of the preferred embodiment of the invention

Referring first to FIG. 1 of the drawings, a refrigerant compressor C is connected by discharge gas tube 10 to reversal valve RV which is connected by tube 11 to outdoor coil 12, and by tube 13 to indoor coil 14. The valve RV is connected by tube 18 containing a coupling 19 to the top of accumulator 24. The top of the accumulator 24 is also connected by suction gas tube 25 to the suction side of the compressor C. The outdoor coil 12 is connected by tube 26 to check-valve manifold 27 which is connected by tube 28 to the indoor coil 14. The manifold 27 is connected to liquid tube 30 which is connected through heat exchange coil 31 within the accumulator to inlet of expansion valve EV, the outlet of which is connected by tube 32 to the manifold 27.

The manifold 27 is disclosed in detail in my and R. W. Ayling's joint Patent No. 2,299,661.

The liquid tube 30 has a portion 33 in heat exchange contact with the suction gas tube 25, and has another portion 34 in heat exchange contact with the tube 18 upstream of the coupling 19.

Referring now to FIG. 2 of the drawings, the expansion valve EV has a diaphragm chamber 38 across which extends a bimetallic diaphragm 39. A heater resistor 40 coated with suitable insulation such as Teflon, is in heat exchange with the diaphragm 39. The ends of the resistor 40 are connected to wires 41 which extend through an insulator bushing 42 in the wall of the chamber 38. The diaphragm 39 is connected at its center to one end of piston rod 43 which has a valve piston 44 on its other end. The body of the valve EV has a partition 45 extending across its interior between its inlet and outlet, and which has a valve opening 47, the edge of which forms a seat for the piston 44 when the latter closes the opening 47.

Referring now to FIG. 3 of the drawings, a NTC thermistor 48 is supported by insulator bracket 49 from the inner surface of the coupling 19. The ends of the thermistor 48 are connected to wires 50 which extend through an insulator bushing 51 in the wall of the coupling 19.

Referring now to FIG. 4 of the drawings, the thermistor 48 and the heater resistor 40 are connected in series to electric current source 52.

Cooling operation of the heat pump

The solid-line arrows alongside the tubing of FIG. 1 show the direction of refrigerant flow during cooling operation. The reversal valve RV is adjusted to its cooling position so that discharge gas from the compressor C flows through the tube 10, the reversal valve RV and the tube 11 into the outdoor coil 12 operating as a condenser coil. Refrigerant liquid flows from the coil 12 through the tube 26 into the manifold 27, and from the latter through the tube 30 and the coil 31 within the accumulator 24 into the expansion valve EV. Refrigerant flows from the valve EV through the tube 32 into the manifold 27, and from the latter through the tube 28 into the indoor coil 14 operating as an evaporator coil. Gas and unevaporated refrigerant liquid flow from the coil 14 through the tube 13, the reversal valve RV, the tube 18 and the coupling 19 into the accumulator 24. Gas separated from the liquid within the accumulator 24, flows through the suction gas tube 25 to the suction side of the compressor C.

The heat pump is so designed that as a result of a large amount of subcooling of the refrigerant liquid, the coil that is operating as an evaporator coil is overfed so that, for example, 8% refrigerant liquid, and 92% gas flow from the coil operating as an evaporator coil into the tube 18. Heat from the high pressure liquid flowing through the liquid tube portion 34 in contact with the tube 18 upstream of the coupling 19 and thermistor 48 evaporates most of the 8% liquid, the high pressure liquid being subcooled by this heat exchange, so that, for example, 1% refrigerant liquid and 99% gas flow through the coupling 19 in contact with the thermistor 48. If more than 1% liquid passes in contact with the thermistor 48, the latter is so cooled that its resistance increases and reduces the current flowing through the heater resistor 40. This results in the temperature of the bimetallic diaphragm 39 decreasing so that the latter warps to move the valve piston 44 towards closed position to decrease the quantity of refrigerant supplied to the coil operating as an evaporator coil. If less than 1% refrigerant liquid passes in contact with the thermistor 48, its temperature increases and its resistance decreases, increasing the current flowing through the heater resistor 40, increasing the temperature of the bimetallic diaphragm 38 which warps to move the valve piston 44 towards open position to increase the quantity of refrigerant supplied to the coil operating as an evaporator coil.

Heat from the high pressure liquid flowing through the coil 31 within the accumulator 24, evaporates the refrigerant liquid that has flowed past the thermistor 48 into the accumulator 24, the high pressure liquid being further subcooled by this heat exchange. Heat from the high pressure liquid flowing through the liquid tube portion 33 in contact with the suction gas tube 25, evaporates any refrigerant liquid which may have entered the suction gas tube, and superheats the suction gas, the high pressure liquid being further subcooled by this heat exchange.

If the suction gas tube 25 is provided with a U-shaped portion within the accumulator, with an oil bleed hole in its bottom, as disclosed in my previously mentioned Patent No. 3,264,837, the heat exchange coil 31 within the accumulator 24 can be omitted since the oil bleed hole could be sized to pass refrigerant liquid from within the accumulator 24 into the suction gas tube at the rate at which refrigerant liquid flows past the thermistor 48 into the accumulator. Heat from the high pressure liquid flowing through the liquid tube portion 33 in contact with the suction gas tube 25 would evaporate the refrigerant liquid which so enters the suction gas tube so that no refrigerant liquid would flow into the compressor C.

Heating operation of the heat pump

The dashed-line arrows alongside the tubing of FIG. 1 show the direction of refrigerant flow during heating operation. The reversal valve RV is adjusted to its heating position so that discharge gas from the compressor C flows through the tube 10, the valve RV and the tube 13 into the indoor coil 14 operating as a condenser coil. Refrigerant liquid flows from the coil 14 through the tube 28 into the manifold 27, and from the latter through the liquid tube 30 and the coil 31 within the accumulator 24 into the expansion valve EV. Refrigerant flows from the valve EV through the tube 32 into the manifold 27, and from the latter through the tube 26 into the outdoor coil 12 operating as an evaporator coil. Gas and unevaporated refrigerant liquid flow from the coil 12 through the tube 11, the valve RV, the tube 18 and the coupling 19 into the accumulator 24. Gas separated from the liquid within the accumulator 24 flows through the suction gas tube 25 to the suction side of the compressor C.

The expansion valve EV and the thermistor 48 operate, and evaporation and resulting subcooling is accomplished, during heating operation, as described in the foregoing.

A non-reversible system would operate as described in the foregoing in connection with cooling operation, with the reversal valve RV and the manifold 27 omitted.

I claim:

1. A refrigeration system comprising a compressor, a condenser, a liquid tube, a heat exchange coil, an expansion valve, an evaporator, a second tube, accumulator means, and a suction gas tube connected in series in the order named, said coil being arranged to evaporate refrigerant liquid within said accumulator means with heat from the high pressure liquid flowing through said coil, the high pressure liquid being subcooled by this heat exchange, and means for adjusting said expansion valve to overfeed said evaporator so that refrigerant liquid and gas flow from said evaporator through said second tube into said accumulator means, said adjusting means comprising means within and responsive to the flow of refrigerant liquid within said second tube for adjusting said valve towards closed position on an increase in the quantity of refrigerant liquid flowing within said second tube above a predetermined quantity, and for adjusting said valve towards open position on a decrease in the quantity of refrigerant liquid flowing within said second tube below said predetermined quantity.

2. A refrigeration system as claimed in claim 1 in which said adjusting means comprises heat responsive means and a heater resistor for heating said heat responsive means, in which said means within said second tube comprises a thermistor, in which there is provided a source of electric current, and in which there is provided means for connecting said resistor and said thermistor to said source so that an increase in the resistance of said thermistor causes a decrease in the current flowing through said resistor.

3. A refrigeration system comprising a compressor, a condenser, a liquid tube, an expansion valve, an evaporator, a second tube, accumulator means, and a suction gas tube connected in series in the order named, means for adjusting said expansion valve to overfeed said evaporator so that refrigerant liquid and gas flow from said evaporator into said second tube, and means providing heat exchange between the high pressure liquid flowing within said liquid tube, and the liquid and gas flowing within said second tube for evaporating with heat from said high pressure liquid, refrigerant liquid flowing within said second tube, said high pressure liquid being subcooled by this heat exchange, said adjusting means comprising means within and responsive to the flow of refrigerant within said second tube downstream of said means providing heat exchange, for adjusting said expansion valve towards closed position on an increase in the quantity of refrigerant liquid flowing within said second tube above a predetermined quantity, and for adjusting said expansion valve towards open position on a decrease in the quantity of refrigerant liquid flowing within said second tube below said predetermined quantity.

4. A refrigeration system as claimed in claim 3 in which means is provided for providing heat exchange between said high pressure liquid flowing within said liquid tube and the suction gas flowing within said suction gas tube for evaporating with heat from said high pressure liquid any refrigerant liquid which may have entered said suction gas tube and for superheating the suction gas, said high pressure liquid being further subcooled by this heat exchange.

5. A heat pump comprising a refrigerant compressor, reversal means, a discharge gas tube connecting said reversal means to the discharge side of said compressor, an outdoor coil, a second tube connecting said reversal means to said coil, an indoor coil, a third tube connecting said reversal means to said indoor coil, accumulator means, a fourth tube connecting said reversal means to said accumulator means, a suction gas tube connecting said accumulator means to the suction side of said compressor, an expansion valve, means including a liquid tube for connecting the one of said coils that is operating as a condenser coil to the inlet of said expansion valve, means including a seventh tube for connecting the outlet of said expansion valve to the one of said coils that is operating as an evaporator coil, said reversal means in cooling position routing discharge gas through said second tube into said outdoor coil operating as a condenser coil, and routing refrigerant from said indoor coil operating as an evaporator coil through said third and fourth tubes into said accumulator means, said reversal means in heating position routing discharge gas through said third tube into said indoor coil operating as a condenser coil, and routing refrigerant from said outdoor coil operating as an evaporator coil through said second and fourth tubes into said accumulator means, means for adjusting said expansion valve to overfeed the one of said coils that is operating as an evaporator coil so that refrigerant liquid and gas flow into said fourth tube, and means providing heat exchange between the high pressure liquid flowing within said liquid tube and the liquid and gas flowing within said fourth tube for evaporating with heat from the high pressure refrigerant liquid flowing within said fourth tube, said high pressure liquid being subcooled by this heat exchange, said means for adjusting said expansion valve comprising means within and responsive to the flow of refrigerant liquid within said fourth tube downstream of said means providing heat exchange, for adjusting said expansion valve towards closed position on an increase in the quantity of refrigerant liquid flowing within said fourth tube above a predetermined quantity, and for adjusting said expansion valve towards open position on a decrease in the quantity of refrigerant liquid flowing within said fourth tube below said predetermined quantity.

6. A heat pump as claimed in claim 5 in which means is provided for providing heat exchange between said high pressure liquid flowing within said liquid tube and the suction gas flowing within said suction gas tube for evaporating with heat from said high pressure liquid any refrigerant liquid which may have entered said suction gas tube and for superheating the suction gas, said high pressure liquid being further subcooled by this heat exchange.

7. A heat pump as claimed in claim 5 in which said adjusting means comprises heat responsive means and a heater resistor for heating said heat responsive means, in which said means within said fourth tube comprises a thermistor, in which there is provided an electric current source, and in which means is provided for connecting said resistor and said thermistor to said source so that an increase in the resistance of said thermistor causes a decrease in the current flowing through said resistor.

8. A heat pump as claimed in claim 7 in which means is provided for providing heat exchange between said high pressure liquid flowing within said liquid tube and the suction gas flowing within said suction gas tube for evaporating with heat from said high pressure liquid any refrigerant liquid which may have entered said suction gas tube and for superheating the suction gas, said high pressure liquid being further subcooled by this heat exchange.

9. A heat pump comprising a refrigerant compressor, reversal means, a discharge gas tube connecting said reversal means to the discharge side of said compressor, an outdoor coil, a second tube connecting said reversal means to said coil, an indoor coil, a third tube connecting said reversal means to said indoor coil, accumulator means, a heat exchanger arranged to heat liquid within said accumulator means, a fourth tube connecting said reversal means to said accumulator means, a suction gas tube connecting said accumulator means to the suction side of said compressor, an expansion valve, means including a liquid tube connecting the one of said coils that is operating as a condenser coil through said heat exchanger to the inlet of said valve, means including a seventh tube connecting the outlet of said valve to the one of said coils that is operating as an evaporator coil, said reversal means in cooling position routing discharge gas through said second tube into said outdoor coil operating as a condenser coil, and routing refrigerant from said indoor coil operating as an evaporator coil through said third and fourth tubes into said accumulator means, said reversal means in heating position routing discharge gas through said third tube into said indoor coil operating as a condenser coil, and routing refrigerant from said outdoor coil operating as an evaporator coil through said second and fourth tubes into said accumulator means, and means for adjusting said expansion valve to overfeed the one of said coils that is operating as an evaporator coil so that refrigerant liquid flows into said fourth tube, said adjusting means comprising means within and responsive to the flow of refrigerant within said fourth tube for adjusting valve towards closed position on an increase in the quantity of refrigerant liquid flowing within said fourth tube above a predetermined quantity, and for adjusting said valve towards open position on a decrease in the quantity of refrigerant liquid flowing within said fourth tube below said predetermined quantity.

10. A heat pump as claimed in claim 9 in which means is provided for providing heat exchange between the liquid flowing within said liquid tube and the refrigerant liquid and gas flowing within said fourth tube.

11. A heat pump as claimed in claim 10 in which said adjusting means comprises means within and responsive to the flow of refrigerant liquid within said fourth tube downstream of said means for providing heat exchange, for adjusting said expansion valve towards closed position on an increase in the quantity of refrigerant liquid flowing within said fourth tube above a predetermined quantity, and for adjusting said expansion valve towards open position on a decrease in the quantity of refrigerant liquid flowing within said fourth tube below said predetermined quantity.

12. A heat pump as claimed in claim 11 in which said means within said fourth tube comprises a thermistor, in which said adjusting means comprises heat responsive means and a heater resistor for heating said heat responsive means, in which there is provided a source of electric current, and in which means is provided for connecting said resistor and said thermistor to said source so that an increase in the resistance of said thermistor causes a decrease in the current flowing through said resistor.

13. A heat pump as claimed in claim 9 in which said adjusting means comprises means within and responsive to the flow of refrigerant liquid within said fourth tube for adjusting said expansion valve towards closed position on an increase in the flow of refrigerant liquid within said fourth tube above a predetermined quantity, and for adjusting said expansion valve towards open position on a decrease in the flow of refrigerant liquid within said fourth tube below said predetermined quantity.

14. A heat pump as claimed in claim 13 in which said means within said fourth tube comprises a thermistor, in which said adjusting means comprises heat responsive means and a heater resistor for heating said heat responsive means, in which there is provided a source of electric current, and in which means is provided for connecting said resistor and said thermistor to said source so that an increase in the resistance of said thermistor causes a decrease in the current flowing through said resistor.

15. A refrigeration system comprising a compressor, a condenser, a liquid tube, an expansion valve, an evaporator, a second tube, accumulator means, and a suction gas tube connected in series in the order named, means for adjusting said expansion valve to overfeed said evaporator so that refrigerant liquid and gas flow from said evaporator into said second tube, said adjusting means comprising a thermistor within said second tube, comprising heat responsive means within said valve for adjusting said valve towards closed and open positions, comprising an electric current source, and comprising means for connecting said resistor and said thermistor to said source so that an increase in the resistance of said thermistor causes a decrease in the current flowing through said resistor, and means providing heat exchange between the liquid flowing within said liquid tube and the liquid and gas flowing within said second tube.

16. A refrigeration system as claimed in claim 15 in which said means providing heat exchange is upstream of said thermistor.

References Cited

UNITED STATES PATENTS

| | | | |
|---|---|---|---|
| 3,163,998 | 1/1965 | Wile | 62—503 |
| 3,264,837 | 8/1966 | Harnish | 62—503 |

MEYER PERLIN, *Primary Examiner.*

U.S. Cl. X.R.

62—160, 503, 513